(12) United States Patent
Walpole et al.

(10) Patent No.: US 7,533,692 B2
(45) Date of Patent: May 19, 2009

(54) SPRINGLESS COMPRESSOR VALVE

(75) Inventors: James J. Walpole, Cypress, TX (US); Zahroof Mohamed, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 11/838,123

(22) Filed: Aug. 13, 2007
(Under 37 CFR 1.47)

(65) Prior Publication Data
US 2008/0223459 A1 Sep. 18, 2008

Related U.S. Application Data

(63) Continuation of application No. 11/057,770, filed on Feb. 14, 2005.

(51) Int. Cl.
*F16K 15/02* (2006.01)
*F16K 31/08* (2006.01)

(52) U.S. Cl. ............. 137/533.27; 137/529; 137/533.31; 251/65

(58) Field of Classification Search ............ 137/528, 137/529, 533.21, 533.27, 533.31; 251/65
See application file for complete search history.

(56) References Cited

U.S. PATENT DOCUMENTS

| | | | |
|---|---|---|---|
| 2,367,260 A * | 1/1945 | Beddoes | 137/529 |
| 2,599,898 A | 6/1952 | Dalrymple | |
| 2,667,895 A | 2/1954 | Pool et al. | |
| 2,888,037 A | 5/1959 | Jones et al. | |
| 3,189,675 A | 6/1965 | Moore et al. | |
| 3,212,751 A | 10/1965 | Hassa | |
| 3,409,038 A | 11/1968 | Blackford | |
| 3,485,441 A | 12/1969 | Eaton, Jr. | |
| 3,495,620 A | 2/1970 | Bazell et al. | |
| 4,273,153 A | 6/1981 | Brown | |
| 4,512,934 A | 4/1985 | Bucher | |
| 4,750,705 A | 6/1988 | Zippe | |
| 5,025,828 A | 6/1991 | Lin | |
| 5,320,136 A * | 6/1994 | Morris et al. | 251/65 |
| 5,961,550 A | 10/1999 | Carpentier et al. | |
| 6,000,417 A | 12/1999 | Jacobs | |
| 6,149,400 A * | 11/2000 | Samland et al. | 251/129.01 |
| 6,581,632 B2 | 6/2003 | Walpole et al. | |
| 6,591,864 B1 | 7/2003 | Denby | |

FOREIGN PATENT DOCUMENTS

EP 0457066 11/1991

(Continued)

OTHER PUBLICATIONS

U.S. Appl. No. 60/900,891, filed Feb. 12, 2007.
U.S. Appl. No. 60/922,933, filed Apr. 11, 2007.
U.S. Appl. No. 60/922,923, filed Apr. 11, 2007.

(Continued)

*Primary Examiner*—John Rivell
(74) *Attorney, Agent, or Firm*—Fletcher Yoder

(57) ABSTRACT

A fluid-handling system that, in some embodiments, includes a poppet having a body, a magnet, and a mounting member configured to secure the magnet to the body is disclosed. Additionally, a method of forming a valve is disclosed. In some embodiments, the method includes providing a poppet body for a valve, providing a magnet, and providing a mounting member configured to attach the magnet to the poppet body

30 Claims, 7 Drawing Sheets

FOREIGN PATENT DOCUMENTS

| | | |
|---|---|---|
| EP | 0700668 | 3/1996 |
| GB | 2416822 A | 2/2006 |
| WO | WO2006045300 | 5/2006 |
| WO | WO2006088731 | 8/2006 |

OTHER PUBLICATIONS

Joe Kane, Unique Poppet Valve Developed for Priston Compressors, CompressorTechTwo, May-Jun. 1997, Diesel & Gas Turbine Publications Flensburg, Democratic Republic of Germany.

* cited by examiner

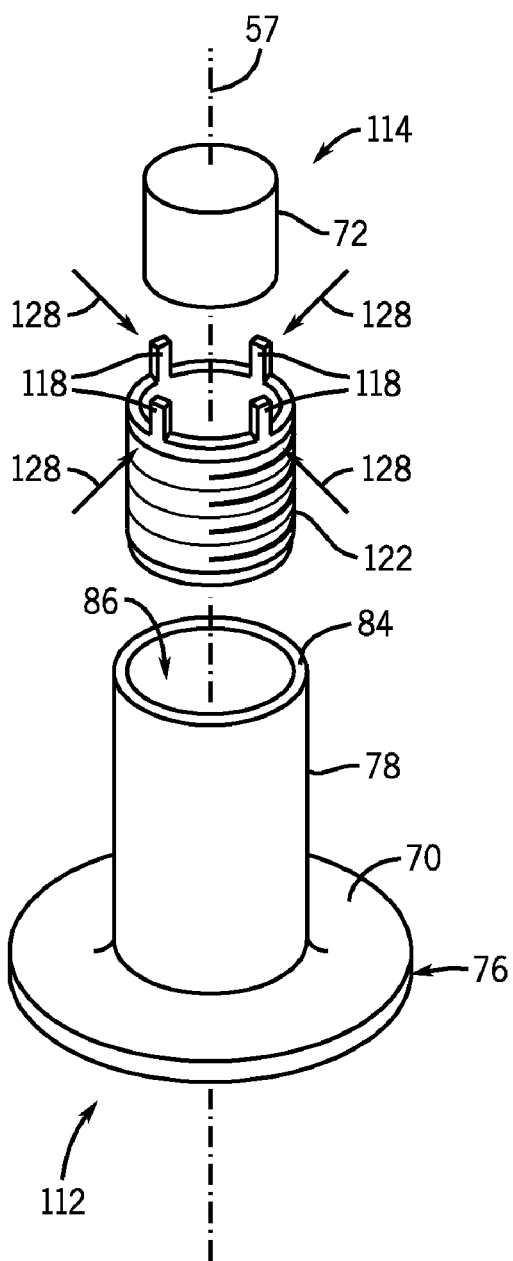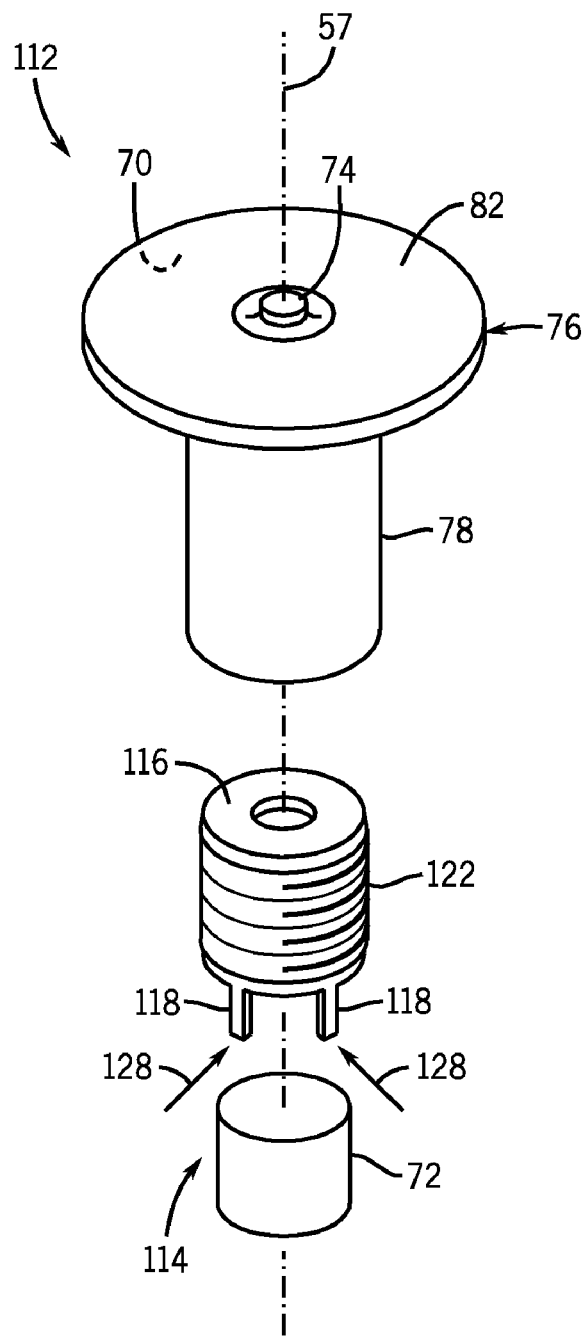
FIG. 7
FIG. 8

US 7,533,692 B2

SPRINGLESS COMPRESSOR VALVE

PRIORITY CLAIM

This application is a continuation-in-part of U.S. patent application Ser. No. 11/057,770, filed on Feb. 14, 2005, and hereby incorporated by reference herein.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In a variety of applications, fluids are compressed and conveyed through a compressor valve. Generally, on an upstream side of the valve, the fluid pressure is periodically elevated, e.g., by an oscillating piston. While the fluid is in a compressed state, the valve opens to allow flow of the compressed fluid to the other side of the valve. Typically, this continues until the pressure of the fluid drops, and the valve closes, thereby sealing the compressed fluid on the other side of the valve. Over time, this cycle is typically repeated a large number of times. For example, some reciprocating compressors run at 300-1800 RPM, which cycles their valves at between 5-30 times per second.

The compressor valves often include components that wear, among which, in particular, are springs. In many valves, a spring pushes the valve closed when the force from the pressure difference across the valve is less than the spring force. Over the life of such valves, the spring may cycle from a compressed state to a relaxed state a large number of times, and this cycling may cause the spring to fatigue. Due to this wear, the compressor valves are often subject to expensive maintenance.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIGS. 7 and 8 are exploded, perspective views of the poppet of FIG. 6;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

An exemplary valve closure system is described below. Some embodiments of this system are particularly suited to reciprocating compressors that, in some embodiments, employ no springs and urge the valve in the closed direction by the force generated from magnets positioned to repel each other. Other applications are envisioned, and different techniques for replacing the spring component in such valve assemblies are also contemplated.

Figure 1:
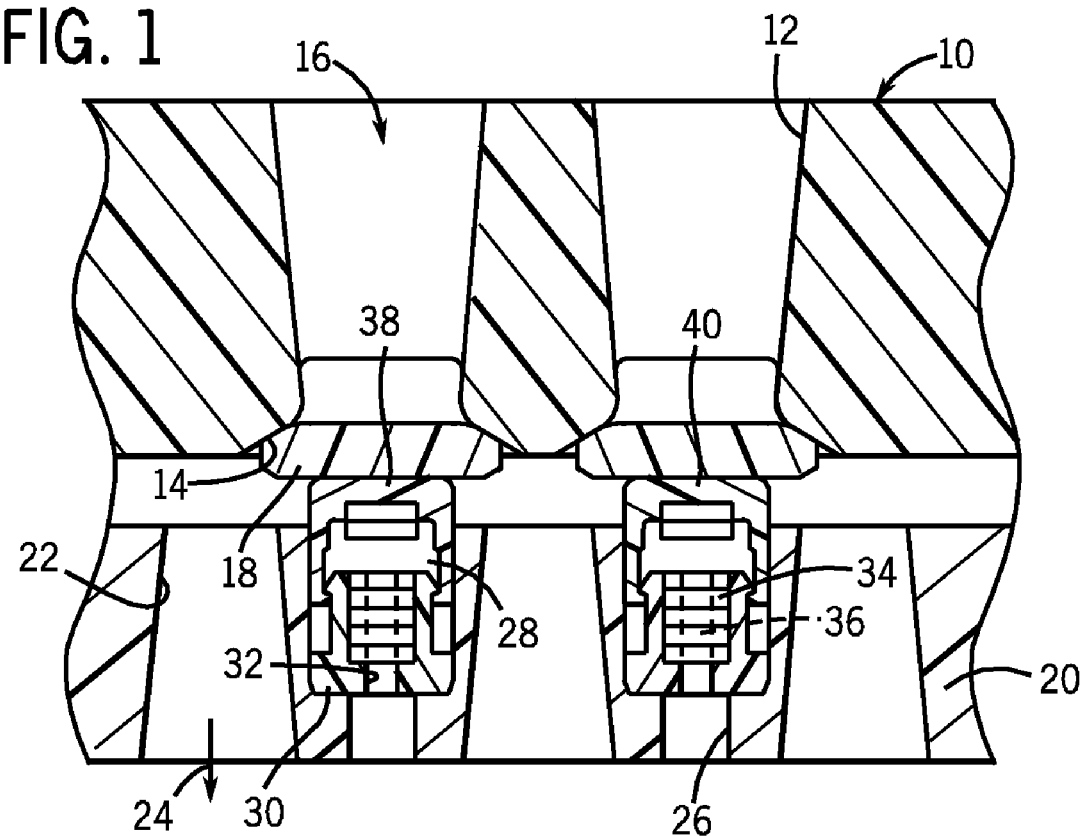
FIG. 1 is a section view of an embodiment of a magnet-actuated, concentric-ring valve.
Figure 2:
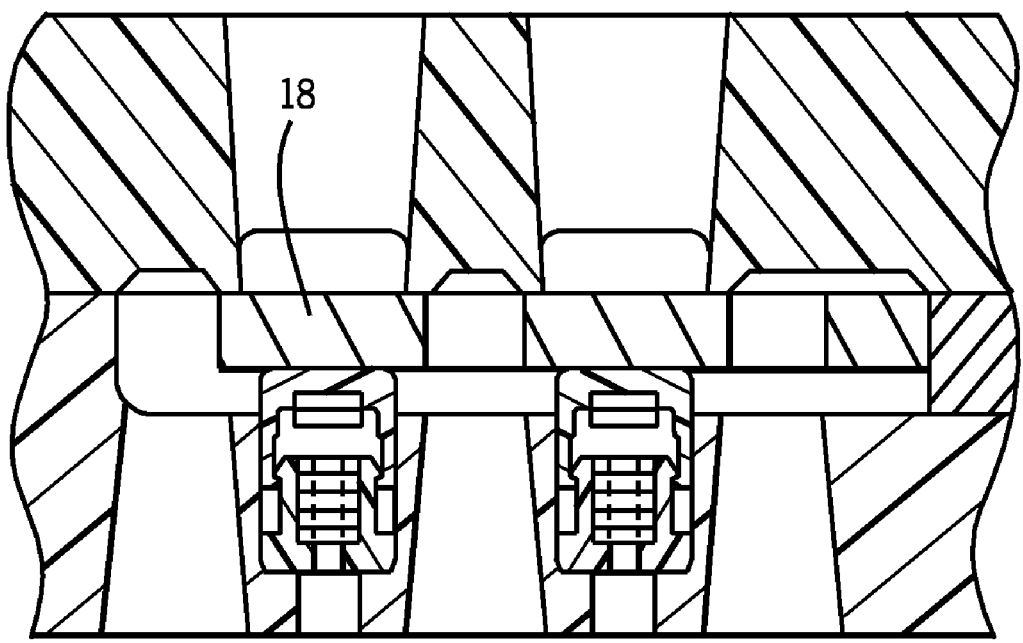
FIG. 2 is a section view of an embodiment of a magnet-actuated, ported-plate valve in a compressor.
Figure 3:
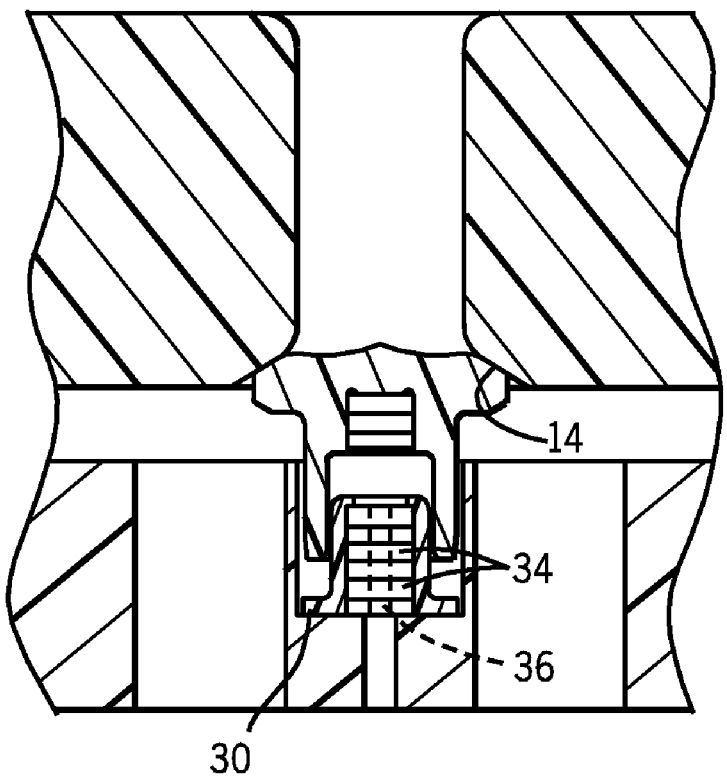
FIG. 3 is a section view of an embodiment of a magnet-actuated, poppet valve in a compressor.
Figure 4:
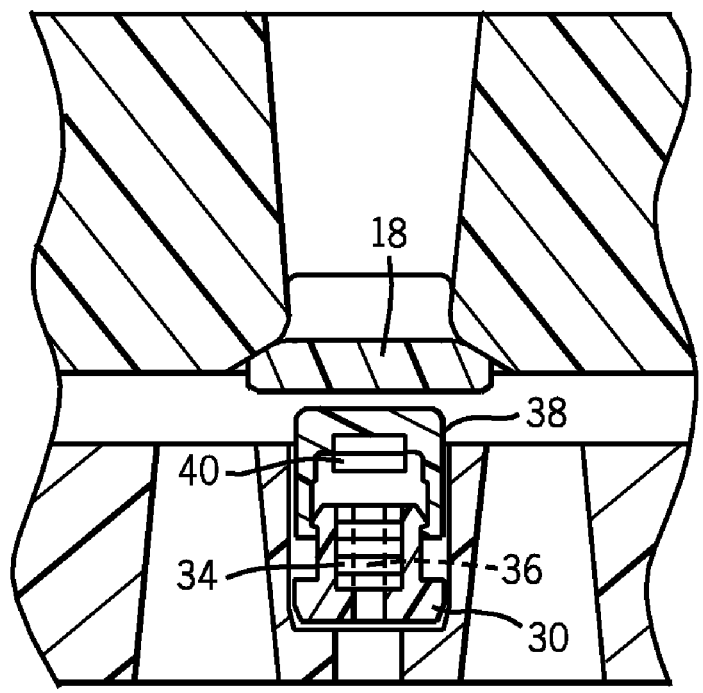
FIG. 4 is a section view of an embodiment of a magnet magnet-actuated, ring valve which uses either a single ring or a multitude of generally identical rings (which are not necessarily concentric) in a compressor.

Referring to FIG. 1, the seat 10 has passages 12 that lead to a seating surface 14. Flow represented by arrow 16 progresses on pressure buildup to push against the valve member 18 to displace it from the seating surface 14, whereupon the flow passes through guard 20 via passages 22, as represented by arrow 24. Aligned with the valve member 18 and extending in guard 20 is a small bore 26 leading into a larger bore 28. A shoe 30 having a bore 32 is secured or mounted in bore 28. A magnet 34 that has a bore 36 aligned in fluid communication with bore 32 is mounted in shoe 30. A button 38 rides over a portion of the shoe 30 and is slidably retained to it to limit its stroke and to keep the two from being detached in ported plate and ring valves. In poppet valves shown in FIG. 3, there is no shoe; instead, a magnet is mounted directly in the poppet, and is not slidably retained. A magnet 40 is mounted to the button 38 in such a manner that the orientations of magnets 34 and 40 are such that like poles face each other creating a repelling force that is overcome by rising pressure in passages 12 that lifts the valve member 18 off of seating surface 14. The valve member 18 can be any one of a number of designs. A concentric ring design is illustrated in FIG. 1 and a ported plate design is shown in FIG. 2, a poppet valve is shown is FIG. 3, and a ring, either single ring or multiple same size non-concentric rings for the valve member 18 is shown in FIG. 4. In all other respects the illustrated embodiments of FIGS. 1, 2 and 4 work in generally the same way. The presently discussed embodiment also works the same way, but there is no button (the magnet is in the poppet) in FIG. 3, and the poppet is not slidably retained.

In some embodiments, the springs on valves, particularly in compressor applications, can be eliminated using the magnets. The magnets can be permanent or electromagnets or combinations of both. The magnets represent just one embodiment that eliminates springs to close the valves. Other solutions to replace the springs in such valves may employ other forces that can be delivered over a physical gap without mechanical contact, and these embodiments are also within the scope of the invention. Therefore, solutions that employ various fields to span a gap or that employ fluid pressure optionally in conjunction with accumulators, for example, are all within the scope of the invention.

Thus the problem addressed by some embodiments of the present invention is to present a valve design that can provide an economical construction and a reliably long service life. That objective is accomplished, in certain embodiments, by elimination of the spring and the use of a force that preferably has a longer life cycle by using components that are less affected or are configured to better withstand the cycling duty of a valve. In one embodiment, the closing force is provided by the alignment of like poles of permanent magnets. Other embodiments are contemplated that deliver a closing force through a device that is not prone to fatigue or wear as would be experienced in an application involving a spring.

In some embodiments, rapid acceleration and deceleration of the button 38, poppet, or other valve components causes damaging inertial forces. As explained above, to conduct the fluid flows indicated by arrows 16 and 24 at the appropriate times, the illustrated button 38 translates back and forth within the guard 20. In certain embodiments, this cycle occurs relatively frequently, for example once per cycle of a compressor. During this oscillation, when the button 38 reaches the end of its travel, it is brought to a stop by impacting either the seat 12 or the shoe 30, depending on the direction in which the button 38 is moving. This impact rapidly decelerates the button 38, and the rapid deceleration may give rise to relatively large inertial forces within the button 38. In particular, in some embodiments, large inertial forces may be applied to the button 38 by the magnet 34, which may have a large mass compared to the rest of the button 38. Thus, the magnet 34 may stress the button 38 during an impact.

The repeated stress from rapidly decelerating the magnet 38 may tend to limit the useful life of the button 38. In some embodiments, after a sufficient number of cycles, the button 38 may fatigue, and it may need to be replaced, thereby potentially increasing the cost of operating the illustrated valve. This problem may be mitigated by some of the subsequent embodiments, which are believed to distribute internal inertial forces more evenly and reduce stress concentrations.

Figure 5:
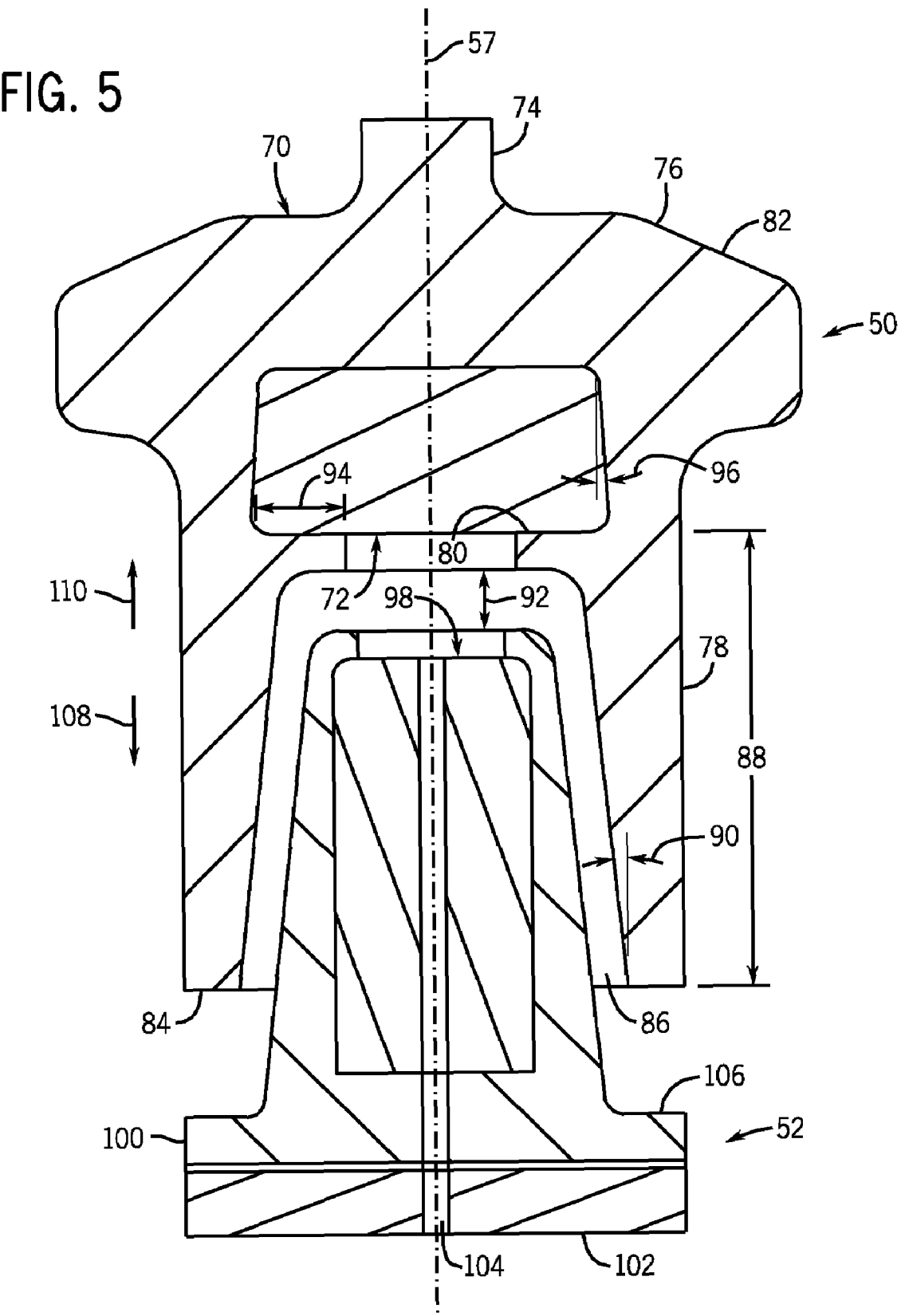
FIG. 5 is a cross-section of a poppet.

FIG. 5 illustrates a poppet 50 and a shoe 52 that is believed to be resistant to some types of fatigue. In this embodiment, these components 50 and 52 have features that are generally rotationally symmetric and concentric about the axis 57, but in other embodiments, these components, or a subset of their features, may not be concentric or rotationally symmetric, e.g., they may have an elliptical horizontal cross-section. The poppet 50 and shoe 52 may be used in a variety of types of valves, including the valves described above and the valve 44 described below with reference to FIG. 9.

The illustrated poppet 50 includes a body 70 and a magnet 72. In this embodiment, the body 70 features a sprue tip 74, a head 76, a leg 78, and a shelf 80. The sprue tip 74 is an artifact of an injection molding process by which the body 70 is formed, and which is described below. In some embodiments, this feature 74 may be removed by machining. The illustrated head 76 defines a contact surface 82 against which a seat seals (e.g., the seat 46 shown in FIG. 9), and in this embodiment, the contact surface 82 is angled downward to delimit a generally frusto-conical volume on the upstream side of the head 76.

The illustrated leg 78 extends from a downstream side of the head 76 and defines a distal surface 84. In this embodiment, the leg 78 has a generally circular, tubular shape and demarcates a frusto-conical interior volume 86. The leg 78 has a leg length 88 that is defined as the distance between the bottom of the magnet 72 and the distal surface 84, and a leg angle 90 that is defined as the angle between a side of the leg 78 and the axis 57. The leg angle 90 may be formed by an interior side of the leg 78 (as illustrated), an exterior side of the leg 78, or both. In some embodiments, the leg angle 90 is greater than or approximately equal to 0 degrees, 5 degrees, or 15 degrees.

The shelf 80 may extend under the magnet 72 to retain the magnet 72. In this embodiment, the shelf 80 meets the leg 78 at a fillet 92, and the shelf 80 extends along a shelf distance 94. In some embodiments, the fillet 92 may have a radius that is relatively large compared to the shelf distance 94. For example, the fillet radius 92 may be larger than 20%, 50%, 80%, 120%, or 150% of the shelf distance 94. Advantageously, a large fillet radius 92 is believed to diffuse stress in the body 70 and mitigate fatigue from inertial forces applied by the magnet 72.

Between the head 76 and the shelf 80, the body 70 holds the magnet 72. In this embodiment, the magnet 72 has a generally frusto-conical shape, with a magnet angle 96 defined as the angle between a side of the magnet 72 and the axis 57. The magnet 72 may be any of a variety of types of magnets, such as a neodymium magnet or other rare earth magnet, and the magnet angle 90 may have a positive, negative, or generally zero value (e.g., the angle may be acute or the sides may be parallel). Advantageously, during an impact, the illustrated magnet 72 is believed to distribute part of its inertial load to the portion of the body 70 along its sides, thereby potentially further reducing stress concentrations in the body 70.

In some embodiments, poppet 50 is formed by injection molding the body 70 around the magnet 72. To this end, the magnet 72 is initially positioned within a mold that is complementary to the body 70, and a plastic, such as a carbon fiber infused thermoplastic, or other material, is injected into the mold, around the magnet 72. As a result of this insert-molding process, the poppet body 70 secures the magnet 72 without an intermediate member or substance. Other embodiments, such as those described below in reference to FIGS. 6-7, may support the magnet 72 with an intermediate member.

The shoe 52, in the present embodiment, includes a repelling magnet 98, a shoe body 100, a shock absorber 102, and a fluid-drainage passage 104. The repelling magnet 98 may be oriented relative to the magnet 72 such that it drives the magnet 72 away from the shoe 52 with a magnetic force. The shoe body 100 may be injection molded around the repelling magnet 98.

The shape of the illustrated shoe body 100 is complementary to the interior volume 86 defined by the leg 78 and defines an impact surface 106. In the present embodiment, the shock absorber 102 is disposed adjacent shoe body 100 opposite the impact surface 106. However, in other embodiments, the shock absorber 102 may be positioned on the other side, between the impact surface 106 and the distal surface 84 of the leg 78. The shock absorber 102 may be made of nylon, elastomer, or other appropriate, resiliently-compressible materials.

Figure 9:
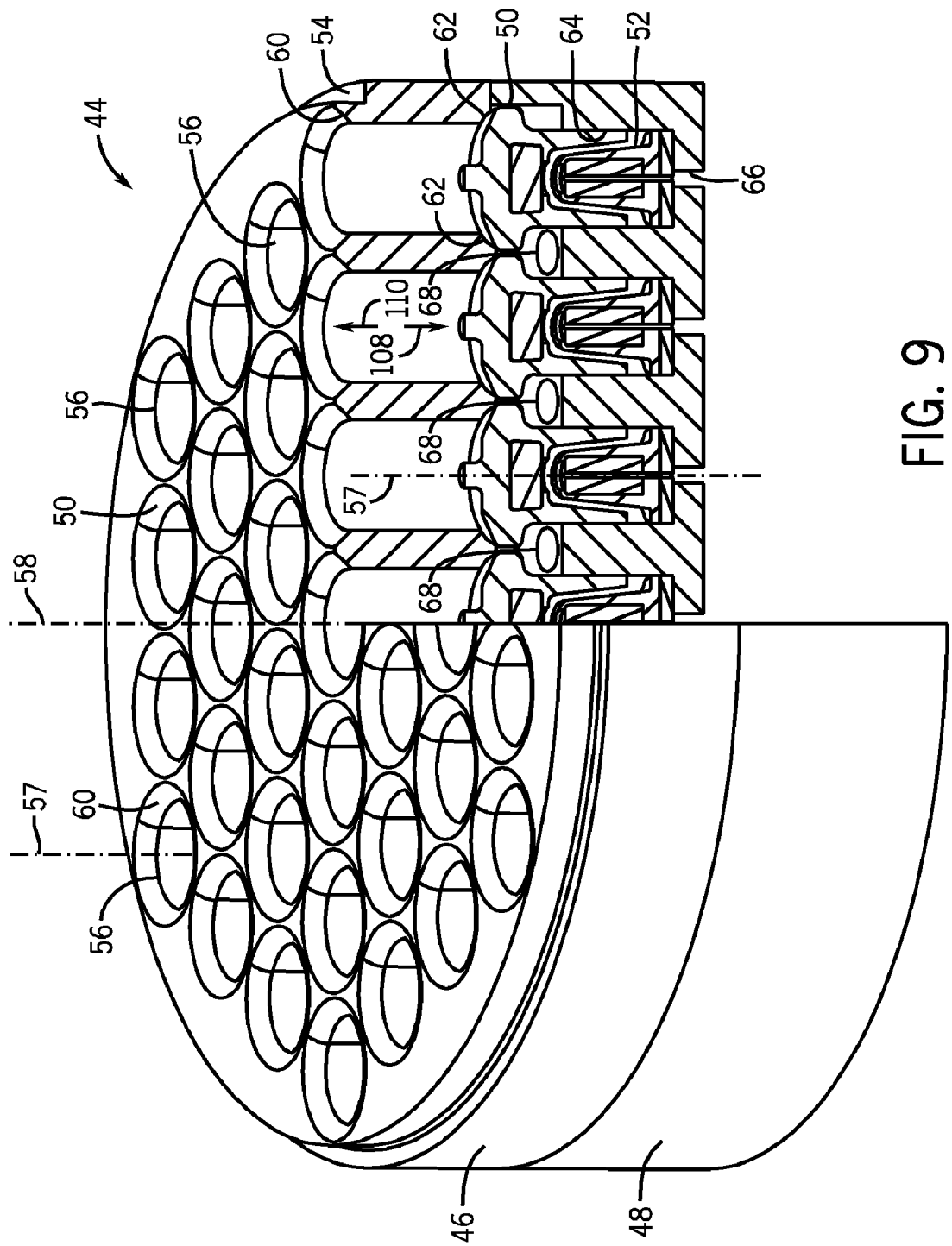
FIG. 9 is a partial cross-section of another embodiment of a poppet valve.

In operation, an elevated fluid pressure (e.g., a gas pressure, such as air pressure) in the intake passage 56 (as illustrated in FIG. 9) may drive the poppet 50 toward the shoe 52. This movement is indicated by arrow 108. As the poppet 50 translates downstream, fluid in the interior volume 86 escapes through the fluid-drainage passage 104. The poppet 50 translates into the poppet receptacle 64 until the distal surface 84 of the leg 78 reaches the impact surface 106, and while it is translating, the poppet receptacle 64 and/or the shoe 52 guide the poppet's movement 108.

The poppet 50 stops when it impacts the shoe 52, and the leg 78 and shock absorber 102 may flex, e.g., resiliently compress, to gradually slow its movement 108. The length of the leg 78 and thickness of the shock absorber 102 may be selected with a desired degree of resiliency in mind. The longer the leg 78, the more material to strain and act as spring, gradually slowing the poppet's movement 108. Similarly, a thicker shock absorber 102 may tend to slow the poppet 50 more gradually, i.e., decrease its deceleration. The components may also dissipate the impact energy by, for example, dampening the impact and converting kinetic energy into heat or sound.

When the poppet 50 is recessed, in this embodiment, the fluid flows through the intake passage 56, between the seating surface 62 and the contact surface 82 of the poppet 50, and out through the outlet passage 68. Fluid continues to flow until the pressure on either side of the poppet 50 equalizes to some degree determined, in part, by the strength and separation of the magnets 72 and 98.

When the pressure in the intake passage 56 and the outlet passage 68 equalizes, or is reduced below some threshold, the magnets 72 and 98 return the poppet 50 to its original position. At this time, the poppet 50 translates back through the poppet receptacle 64, away from the shoe 52, as indicated by arrow 110. The poppet 50 continues moving until the contact surface 82 of the head 76 reaches the seating surface 62 of the seat 46. When they contact, the seating surface 62 and contact surface 82 seal the intake passage 56 from the outlet passage 68. In some embodiments, the magnets 72 and 98 bias the poppet 50 against the seating surface 62.

Once returned, the poppet 50 remains in contact with the seating surface 62 until the pressure in intake passage 65 rises again, at which point, the above-described cycle repeats.

Advantageously, certain features of the poppet 50 are believed to reduce the magnitude of its inertial forces by decreasing the deceleration of the poppet 50. Some components may gradually slow the poppet 50 when it impacts the shoe 52. For example, the shock absorber 102 may resiliently compress during an impact, and lengthen the time period over which the poppet 50 is brought to a stop. As a result, because deceleration is reduced, the forces, and resulting stresses within the poppet 50, may be reduced. The leg 78 may also resiliently compress and reduce deceleration. To this end, the leg length 88 may be relatively long to accentuate strain (e.g., non-plastic deformation) within the body 70. Thus, even if the material in the body 70 has a relatively high Young's modulus, the long leg 78 may still act like a spring to some degree. This reduction in acceleration reduces the forces applied to the poppet 50, which may tend to limit fatigue and extend the useful life of the poppet 50.

As mentioned, the poppet body 70 is injection molded around the magnet 72. For certain types of magnets, this may cause problems. The injection molding process may expose the magnet to high temperatures, which may degrade the field strength of the magnet. The injection molding process may result in high built-in stresses near structurally critical areas of the poppet. However, this problem may be mitigated by the embodiment described below, which attaches the magnet to the poppet with a mounting member.

Figure 6:
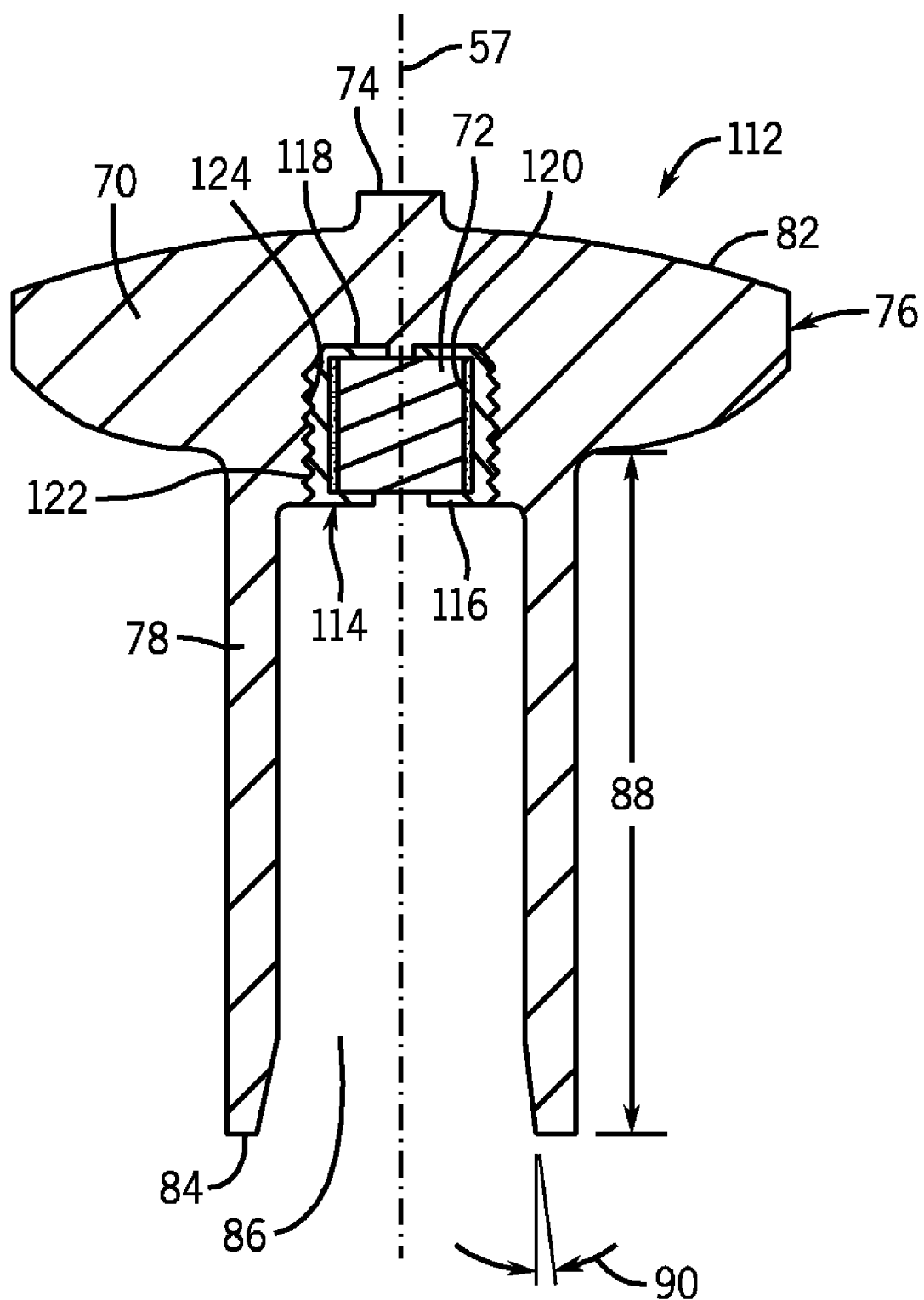
FIG. 6 is a cross-section of another embodiment of a poppet.

FIG. 6 illustrates another embodiment of a poppet 112. In this embodiment, the poppet 112 includes the features of the previously described poppet 50, except that in this embodiment, the magnet 72 is mounted to the body 70 by a mounting member 114, which may be made from metal, high-strength plastic, or other appropriate materials. The mounting member 114 transfers forces from the magnet 72 to the body 70. In various embodiments, the mounting member 114 may either be disposed between the two, as an intermediate member, or interlock the two in some other manner.

The mounting member 114 includes several features that cooperate to secure the magnet 72. In this embodiment, the mounting member 114 has a downstream restraint 116 and a downstream restraint 118, which overlap opposing sides of the magnet 72 to secure the magnet 72. Additionally, the mounting member 114 couples to the magnet 72 along its sides with an adhesive layer 120. Threads 122 on the exterior sides of the mounting member 114 interface with complementary threads 124 in the inner volume 86 of the poppet 112. The threads 124 may extend along a portion of the leg 78.

FIGS. 7 and 8 illustrate exploded views of the poppet 112 from different perspectives. In this embodiment, the downstream restraint 118 includes one or more plastically-deformable members that are bent over the magnet 72 after the magnet 72 is inserted within the mounting member 114. Other embodiments may not include the downstream restraint 118 and may, instead, use an adhesive layer 120 and/or the body 70 to restrain the magnet 72 on the upstream side of the mounting member 114.

To assemble the poppet 112, first, the body 70 and the mounting member 114 are independently formed. The poppet body 70 may be injection molded in a process similar to the process described above, and the mounting member 114 may be formed from plastic, metal, or other appropriate materials by casting, injection molding, forging, welding, machining, or a combination thereof. In some embodiments, the poppet body 70 may be injection molded around the mounting member 114, before inserting the magnet into the mounting member 114. In some embodiments, the orientation of the mounting member 114 is reversed, and the downstream side of the mounting member 114 includes the deformable members 118.

Once these components are formed, they may be assembled as follows. Adhesive layer 120 may be applied to the interior of the mounting member 114 (as noted, though, some embodiments may not include the adhesive layer 120), and the magnet 72 is inserted into the interior of the mounting member 114. After the magnet 72 is inserted, the downstream restraint 118 may be bent over the magnet 72, as indicated by arrows 128. Then mounting member 114, with the magnet 72 inside, is placed in the interior volume 86 of the poppet body 70, and a tool rotates the mounting member 114 by applying a torque to the tool interface 126. As the mounting member 114 rotates, it threads on to complementary thread 124, thereby securing the magnet 72 in the body 70 of the poppet 112.

Advantageously, in some embodiments, body 70 of the poppet 112 may be formed without exposing the magnet 72 to high temperatures during the injection molding process. In the illustrated embodiment, the magnet 72 is introduced to the poppet body 70 after it is injection molded. Thus, the magnet 72 avoids the heat from the injection molding process. Avoiding these high temperatures is believed to protect the magnet 72 from being degraded by heat, thus potentially avoiding a processing step to re-magnetize the magnet. Forming the body 70 in the absence of the magnet 72 may also avoid stresses from different thermal expansion in the magnet 72 and the body 70.

Additionally, some embodiments may reduce internal stresses in the body 70 of the poppet 112. As mentioned above, the mass of the magnet 72 is relatively large compared to the mass of the body 70. During an impact, inertial forces from the magnet 72 may apply substantial loads to the body 70. As the magnet 72 is slowed, the threads 122 and 124 may distribute the inertial load over an area of the body 70, thereby potentially reducing stress concentrations at any one point within the body 70. Reducing these stress concentrations is believed to extend the useful life of the poppet 112 by reducing fatigue.

Other embodiments may include other types of mounting members. For example, some embodiments may include an elastically deformable mounting member with one or more slots along its sides. To insert the magnet 72, the mounting member may be deformed so the slot is wider, and the magnet 72 may be placed inside the deformed mounting member. Then, the mounting member relaxes around the magnet 72 and the assembly may be attached to the body 70.

FIG. 9 illustrates another example of a valve 44, which may include one or more of the poppets or other valve members described above. The illustrated valve 44 includes a seat 46, a guard 48, a plurality of poppets 50, and a plurality of shoes 52. In this embodiment, each poppet 50 and corresponding shoe 52 are housed by the seat 46 and the guard 48, which abut one-another and have a generally circular, cylindrical shape. Below, these components are described individually, in greater detail.

In this embodiment, the seat 46 includes a cylindrical lip 54 and a plurality of intake passages 56 in a hexagonal packing arrangement. The illustrated intake passages 56 define generally circular, cylindrical volumes, which are concentric about respective axes 57. These axes 57 are generally parallel to both each other and a central axis 58 of the valve 44. An upstream portion of the intake passages 56 includes a concentric radius 60, and a downstream portion includes a concentric, chamfered seating surface 62. Other embodiments may include intake passages 56 with different shapes, arrangements, or orientations.

In FIG. 9, the downstream side of the seat 46 seals against the guard 48, which in this embodiment, includes a plurality of poppet receptacles 64, fluid-drainage apertures 66, and outlet passages 68. The poppet receptacles 64 are generally circular, cylindrical volumes that are also concentric about the respective axes 57. The poppet receptacles 64 are sized to match the poppet 50, so that the poppet 50 may translate within the poppet receptacle 64 along a generally linear path. Consequently, these poppets 50 may be characterized as having a single degree of freedom, which, as an example, in this embodiment, is their position along the axis 57. Other embodiments may have additional degrees of freedom that correspond to different types of movement.

The fluid-drainage apertures 66 are disposed under shoe 52 and are in fluid communication with a volume 86 (FIG. 5) between the poppet 50 and shoe 52. The illustrated outlet passages 68 are generally parallel to both one another and the intake passages 56. In this embodiment, the outlet passages 68 are disposed off-axis from the intake passages 56, beside the poppets 50, and extend through the guard 48 to its downstream side. Other embodiments may not include the poppet receptacles 64. In some embodiments, the shoe 52 may guide the movement of the poppet 50. It should also be noted that some guards 48 may not include the fluid-drainage apertures 66, which should not be construed to suggest that any other features discussed herein may not also be omitted.

The various valves described above may be employed in a variety of fluid-handling systems, including fluid compressors. An exemplary compressor 210 is provided in FIG. 10. In the presently illustrated embodiment, the compressor 210 includes a pair of compression cylinders 212 coupled to a frame 214. As discussed in greater detail below, a variety of internal components may be disposed within the cylinders 212 and the frame 214 to enable compression of fluids within the cylinders 212. In one embodiment, the compressor 210 may be utilized to compress natural gas. However, in other embodiments, the compressor 210 may be configured and/or used to compress other fluids. A mechanical power source or driver 216, such as an engine or an electric motor, may be coupled to the compressor 210 to provide mechanical power to the various internal components and to enable compression of the fluid within the cylinders 212. To facilitate access to such internal components, as may be desired for diagnostic or maintenance purposes, openings in the frame 214 may be provided and selectively accessed via removable covers disposed over the openings.

Further, the exemplary cylinders 212 include capped recesses 218 configured to receive valve assemblies, such as valve assembly 220. The valve assembly 220 may include one or more of the various valve embodiments discussed above. While only a single valve assembly 220 is illustrated, it will be appreciated that, in various embodiments, additional valve assemblies are included within some or all of the other capped recesses 218. It will also be appreciated that the cylinders 212 may include internal fluid conduits between the recesses 218 and the valve assemblies 220 to facilitate flow of a fluid into and out of the cylinders 212 through such valve assemblies. Additionally, various installation components, such as cages or fasteners, may be employed to facilitate mounting of the valve assemblies 220 within the recesses 218.

Although the exemplary compressor 210 is illustrated as a two-throw reciprocating compressor, other compressor configurations may also employ and benefit from the presently disclosed techniques. For instance, in other embodiments, the compressor 210 may include a different number of cylinder throws, such as a four-throw compressor, a six-throw compressor, a couple-free reciprocating compressor, a screw compressor, or the like. Further, other variations are also envisaged, including variations in the length of stroke, the operating speed, and the size, to name but a few.

Figure 10:
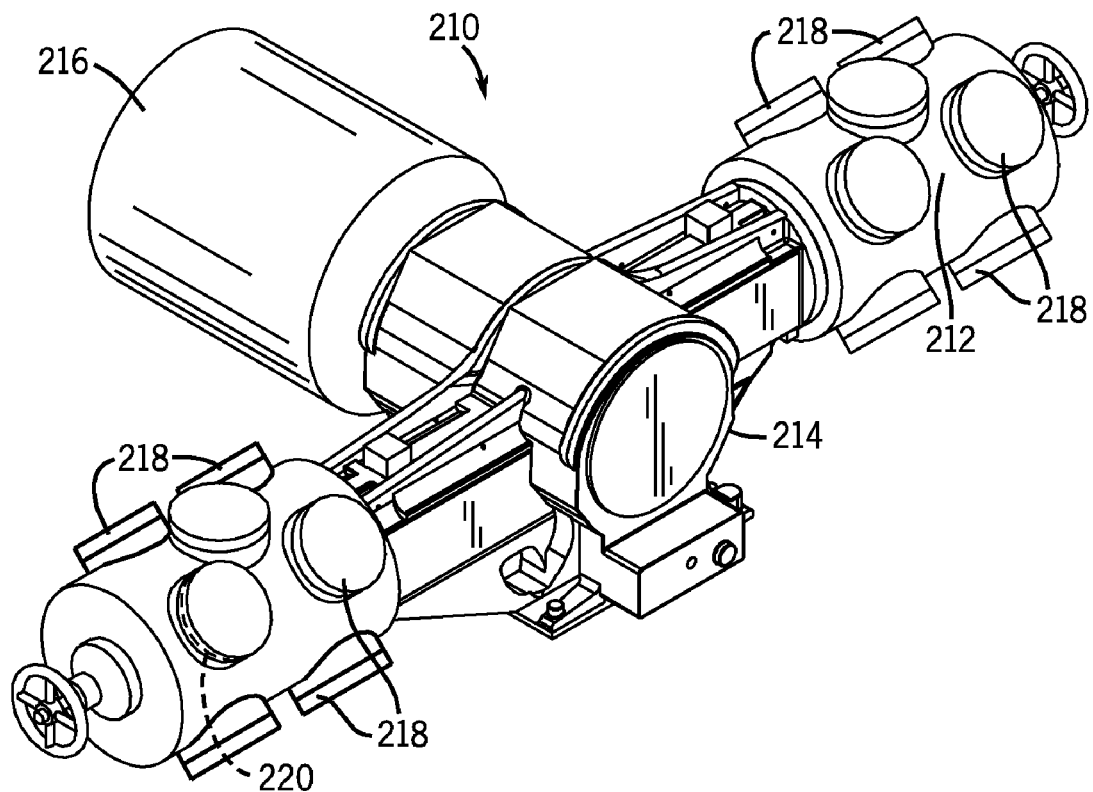
FIG. 10 is a perspective view of an embodiment of a compressor that includes one or more of the features illustrated in FIGS. 1-9.
Figure 11:
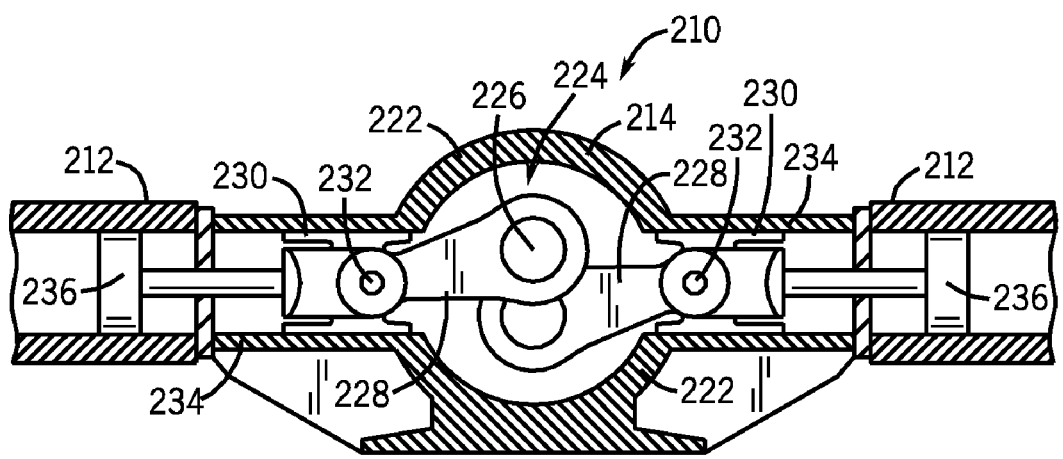
FIG. 11 is a cross-section of the compressor of FIG. 10.

A cross-sectional view of the exemplary compressor 210 is provided in FIG. 11, which illustrates a number of exemplary internal components of the compressor of FIG. 10. In the presently illustrated embodiment, the frame 214 of the exemplary compressor 210 includes a hollow central body or housing 222 that generally defines an interior volume 224 in which various internal components may be received, such as a crankshaft 226. In one embodiment, the central body 222 may have a generally curved or cylindrical shape. It should be noted, however, that the central body 222 may have other shapes or configurations in full accordance with the present techniques.

In operation, the driver 216 rotates the crankshaft 226 supported within the interior volume 224 of the frame 214. In one embodiment, the crankshaft 226 is coupled to crossheads 230 via connecting rods 228 and pins 232. The crossheads 230 are disposed within crosshead guides 234, which generally extend from the central body 222 and facilitate connection of the cylinders 212 to the compressor 210. In one embodiment, the compressor 210 includes two crosshead guides 234 that extend generally perpendicularly from opposite sides of the central body or housing 222, although other configurations are also envisaged. As may be appreciated, the rotational motion of the crankshaft 226 is translated via the connecting rods 228 to reciprocal linear motion of the crossheads 230 within the crosshead guides 234.

As noted above, the cylinders 212 are configured to receive a fluid for compression. The crossheads 232 are coupled to pistons 236 disposed within the cylinders 212, and the reciprocating motion of the crossheads allows compression of fluid within the cylinders 212 via the pistons 236. Particularly, as the piston 236 is driven forward (i.e., outwardly from central body 222) into the cylinder 212, the piston 236 forces fluid within the cylinder into a smaller volume, thereby increasing the pressure of the fluid. A discharge valve, such as valve assembly 220, may then open to allow the pressurized or compressed fluid to exit the cylinder 212. The piston 236 may then stroke backward, and additional fluid may enter the cylinder 212 through an inlet valve, which may also comprise the valve assembly 220, for compression in the same manner described above. Further, as will be appreciated, the cylinders 212 can be configured to facilitate fluid compression on both the forward and the backward strokes of the piston 236. For instance, as the piston 236 moves forward in the manner discussed above to compress fluid on one side of the piston, additional fluid may be introduced into the cylinder on the opposite side of the piston. Such fluid would then be compressed on the backward stroke of the piston 236.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A fluid-handling system, comprising:
   a poppet comprising:
      a body, comprising a head having a sealing surface configured to seal against a seating surface, and a leg extending from a downstream side of the head;
      a magnet; and
      a mounting member configured to secure the magnet to the body;
      wherein the leg has a generally tubular shape that defines an interior volume in which both the magnet and the mounting member are disposed.

2. The system of claim 1, wherein the sealing surface defines a generally frusto-conical volume.

3. The system of claim 1, wherein the mounting member comprises an elastically deformable member configured to secure the magnet to the body.

4. The system of claim 1, wherein the mounting member comprises threads configured to secure the mounting member to the body.

5. The system of claim 1, wherein the mounting member comprises a plastically-deformable member configured to secure the magnet to the mounting member.

6. The system of claim 1, comprising an adhesive disposed between the magnet and the mounting member.

7. The system of claim 1, wherein:
   the body is a one-piece body made of a material that includes plastic, wherein the leg is a tubular leg, and wherein both the head and the tubular leg are rotationally symmetric about the same axis;
   the mounting member includes metal and comprises:
      a plurality of plastically deformable members extending from an upstream side of the mounting member;
      a generally circular-tubular sidewall with exterior threads configured to secure the mounting member to complementary threads disposed inside a tubular portion of the head; and
      a downstream restraint having a tool interface configured to receive torque from a tool; and
   the magnet is disposed within the circular-tubular sidewall of the mounting member, between the plurality of plastically deformable members and the downstream restraint.

8. The system of claim 1, comprising:
   a seat having an intake passage with a seating surface, wherein the seat is disposed upstream from poppet;
   a shoe disposed downstream from the poppet and having a repelling magnet;
   a guard having a shoe receptacle in which the shoe is disposed and an outlet passage.

9. The system of claim 8, wherein the shoe comprises a shock absorber.

10. The system of claim 8, wherein the shoe, the repelling magnet, and the guard have a fluid-drainage aperture.

11. The system of claim 8, comprising a compressor having a compression cylinder in fluid communication with the intake passage and a driver coupled to a piston disposed within the compression cylinder.

12. A valve, comprising:
   a poppet comprising:
      a magnet, wherein a downstream side of the magnet is substantially wider than an upstream side of the magnet; and
      a body disposed about the magnet, wherein the body includes a head and a leg that defines a distal surface that is downstream from the magnet.

13. The valve of claim 12, wherein the leg defines a generally frusto-conical, interior volume.

14. The valve of claim 12, comprising a shelf disposed adjacent a downstream side of the magnet.

15. The valve of claim 14, wherein the shelf includes a fillet on a downstream side of the shelf, where the shelf meets the leg.

16. The valve of claim 12, comprising a plurality of poppet receptacles and a plurality of poppets, wherein the plurality of poppets are configured to translate within a respective poppet receptacle.

17. A method of forming a valve, the method comprising:
   providing a poppet body for a valve;
   providing a magnet;
   providing a mounting member configured to attach the magnet to the poppet body; and
   providing a shelf adjacent a downstream side of the magnet.

18. The method of claim 17, wherein providing the poppet body comprises injection molding the poppet body.

19. The method of claim 17, comprising:
   inserting the magnet into the mounting member; and
   after inserting the magnet, attaching the mounting member to the poppet body.

20. The method of claim 19, wherein attaching the mounting member to the poppet body comprises engaging threads on the poppet body with complementary threads on the mounting member.

21. An apparatus, comprising:
   a compressor; and
   a valve disposed between a fluid inlet and a fluid outlet of the compressor, wherein the valve comprises:
      a valve member, comprising a poppet;
      a mounting member coupled to the valve member; and
      a magnet coupled to the valve member by the mounting member;
      wherein the poppet comprises a leg, and wherein the mounting member is disposed between the magnet and the leg.

22. The apparatus of claim 21, wherein the compressor comprises a piston.

23. A fluid-handling system, comprising:
a poppet comprising:
   a body;
   a magnet;
   a mounting member configured to secure the magnet to the body; and
   an adhesive disposed between the magnet and the mounting member.

24. The system of claim 23, wherein:
the body is a one-piece body made of a material that includes plastic, and wherein the body includes both a head with a sealing surface and a tubular leg extending from the downstream side of the head, wherein both the head and the tubular leg are rotationally symmetric about the same axis;
the mounting member includes metal and comprises:
   a plurality of plastically deformable members extending from an upstream side of the mounting member;
   a generally circular-tubular sidewall with exterior threads configured to secure the mounting member to complementary threads disposed inside a tubular portion of the head; and
   a downstream restraint having a tool interface configured to receive torque from a tool; and
the magnet is disposed within the circular-tubular sidewall of the mounting member, between the plurality of plastically deformable members and the downstream restraint.

25. The system of claim 23, comprising:
a seat having an intake passage with a seating surface, wherein the seat is disposed upstream from poppet;
a shoe disposed downstream from the poppet and having a repelling magnet; and
a guard having a shoe receptacle in which the shoe is disposed and an outlet passage.

26. A fluid-handling system, comprising:
a poppet comprising:
   a one-piece body made of a material that includes plastic, and wherein the body includes both a head with a sealing surface and a tubular leg extending from a downstream side of the head, wherein both the head and the tubular leg are rotationally symmetric about the same axis;
   a magnet; and
   a mounting member configured to secure the magnet to the body, wherein the mounting member includes metal and comprises:
      a plurality of plastically deformable members extending from an upstream side of the mounting member;
      a generally circular-tubular sidewall with exterior threads configured to secure the mounting member to complementary threads disposed inside a tubular portion of the head; and
      a downstream restraint having a tool interface configured to receive torque from a tool; and
   wherein the magnet is disposed within the circular-tubular sidewall of the mounting member, between the plurality of plastically deformable members and the downstream restraint.

27. The system of claim 26, comprising:
a seat having an intake passage with a seating surface, wherein the seat is disposed upstream from poppet;
a shoe disposed downstream from the poppet and having a repelling magnet; and
a guard having a shoe receptacle in which the shoe is disposed and an outlet passage.

28. The system of claim 27, comprising an adhesive disposed between the magnet and the mounting member.

29. A fluid-handling system, comprising:
a poppet comprising:
   a body;
   a magnet; and
   a mounting member configured to secure the magnet to the body;
a seat having an intake passage with a seating surface, wherein the seat is disposed upstream from poppet;
a shoe disposed downstream from the poppet and having a repelling magnet; and
a guard having a shoe receptacle in which the shoe is disposed and an outlet passage.

30. A valve, comprising:
a poppet comprising:
   a magnet;
   a body disposed about the magnet, wherein the body includes a head and a leg that defines a distal surface that is downstream from the magnet; and
   a shelf disposed adjacent a downstream side of the magnet.

* * * * *